United States Patent
Bailie et al.

(10) Patent No.: US 10,035,553 B2
(45) Date of Patent: Jul. 31, 2018

(54) LIGHTWEIGHT BICYCLE SEAT ASSEMBLIES

(71) Applicant: Trek Bicycle Corporation, Waterloo, WI (US)

(72) Inventors: Jess Bailie, Lake Mills, WI (US); Jenn Campbell, Lake Mills, WI (US); Andrew Wilcox-Hull, Madison, WI (US)

(73) Assignee: Trek Bicycle Corporation, Waterloo, WI (US)

( * ) Notice: Subject to any disclaimer, the term of this patent is extended or adjusted under 35 U.S.C. 154(b) by 0 days.

(21) Appl. No.: 15/666,311

(22) Filed: Aug. 1, 2017

(65) Prior Publication Data

US 2017/0327168 A1    Nov. 16, 2017

Related U.S. Application Data

(63) Continuation of application No. 14/329,742, filed on Jul. 11, 2014, now Pat. No. 9,745,010.

(60) Provisional application No. 61/845,276, filed on Jul. 11, 2013.

(51) Int. Cl.
   *B62J 1/08*  (2006.01)
   *B62J 1/00*  (2006.01)
   *B62J 1/18*  (2006.01)

(52) U.S. Cl.
   CPC . *B62J 1/08* (2013.01); *B62J 1/00* (2013.01); *B62J 1/18* (2013.01); *B62J 1/002* (2013.01)

(58) Field of Classification Search
   CPC ......... B62J 1/18; B62J 1/00; B62J 1/08; B62J 1/002

USPC .......................................... 297/195.1, 215.16
See application file for complete search history.

(56) References Cited

U.S. PATENT DOCUMENTS

| | | | |
|---|---|---|---|
| 3,807,793 A | 4/1974 | Jacobs | |
| 5,252,373 A | 10/1993 | Ganske et al. | |
| 5,636,896 A * | 6/1997 | Howard | B62J 1/26 297/199 |
| 6,176,546 B1 | 1/2001 | Andrews | |
| 6,666,507 B1 * | 12/2003 | Ringgard | B62J 1/00 297/195.1 |
| 8,512,842 B2 | 8/2013 | Segato | |
| 2010/0032996 A1 * | 2/2010 | Lee | B62J 1/00 297/195.1 |
| 2014/0145479 A1 * | 5/2014 | Li | B62J 1/002 297/195.1 |

FOREIGN PATENT DOCUMENTS

| | | | | |
|---|---|---|---|---|
| FR | 2296561 A1 * | 7/1976 | ................ | B62J 1/08 |
| GB | 2138745 | 10/1984 | | |

* cited by examiner

*Primary Examiner* — Milton Nelson, Jr.
(74) *Attorney, Agent, or Firm* — Bell & Manning, LLC

(57) ABSTRACT

A bicycle seat apparatus including at least one rail and a saddle shell. The at least one rail can include a first mounting portion. The first mounting portion can include an ankle. A cross section of a terminus of the ankle can be larger than a cross section of the at least one rail. The saddle shell can include at least one mounting cup configured to mate with the first mounting portion of the at least one rail. A cross section of a base of the at least one mounting cup can be larger than a cross section of the terminus of the ankle.

16 Claims, 13 Drawing Sheets

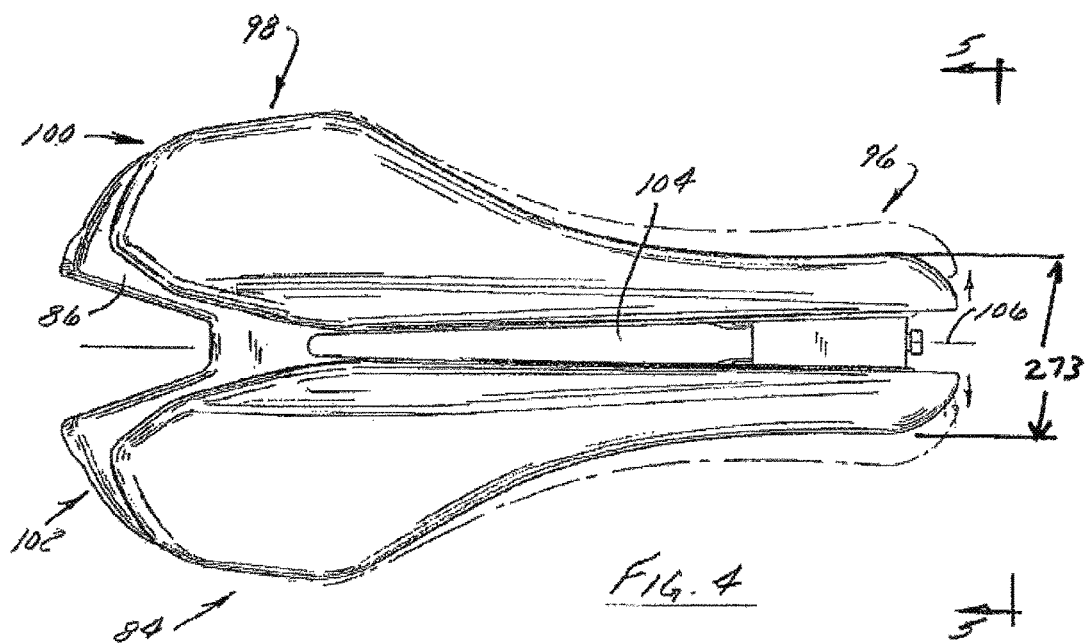
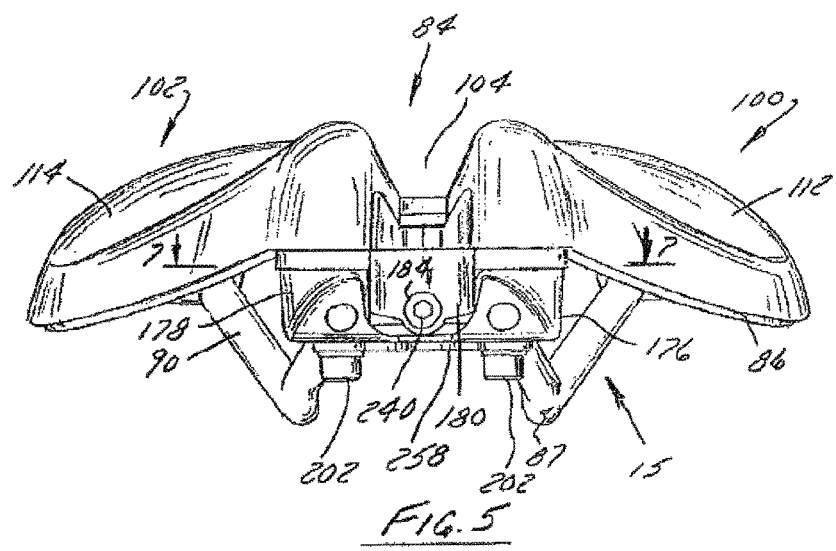

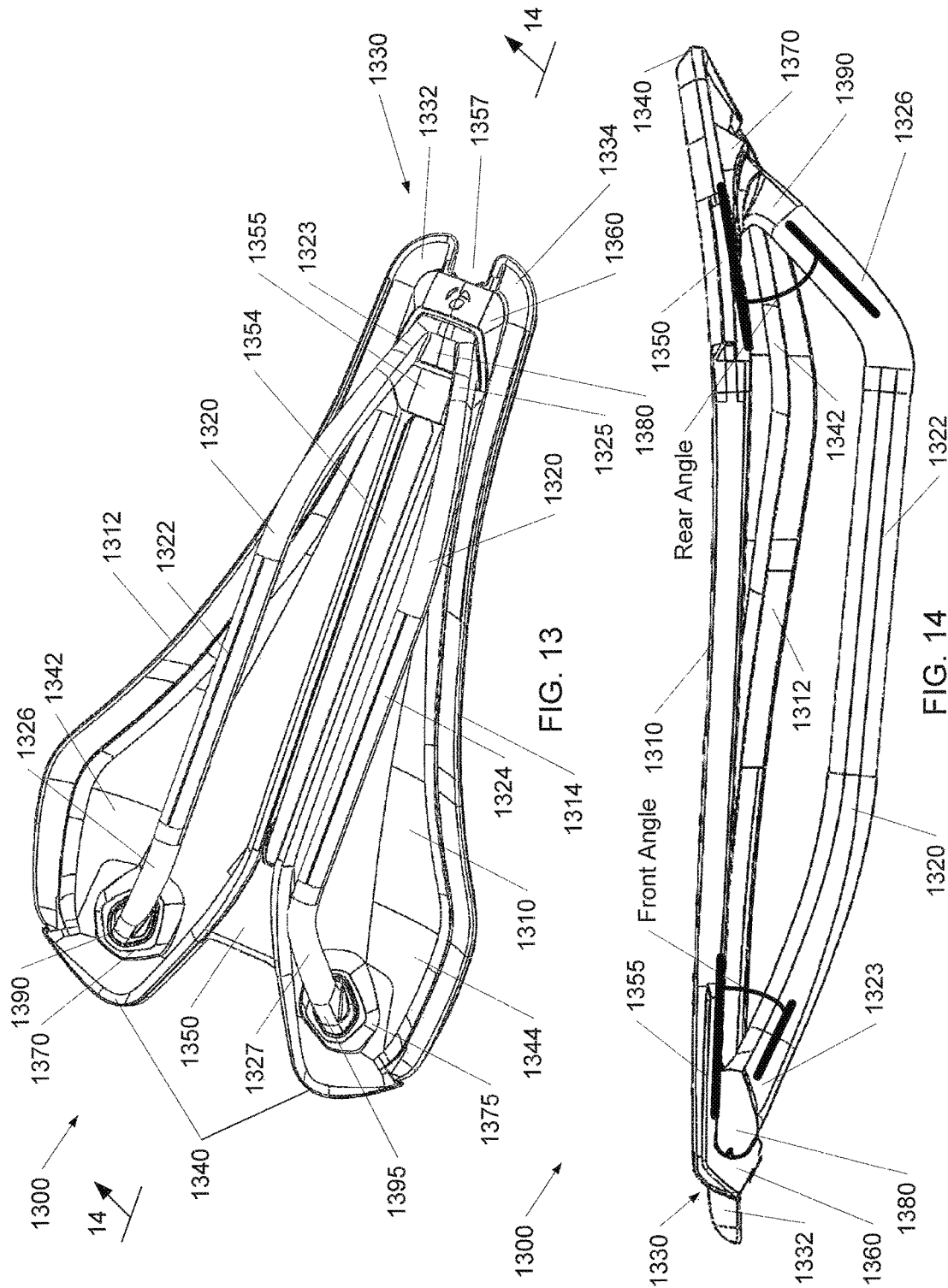

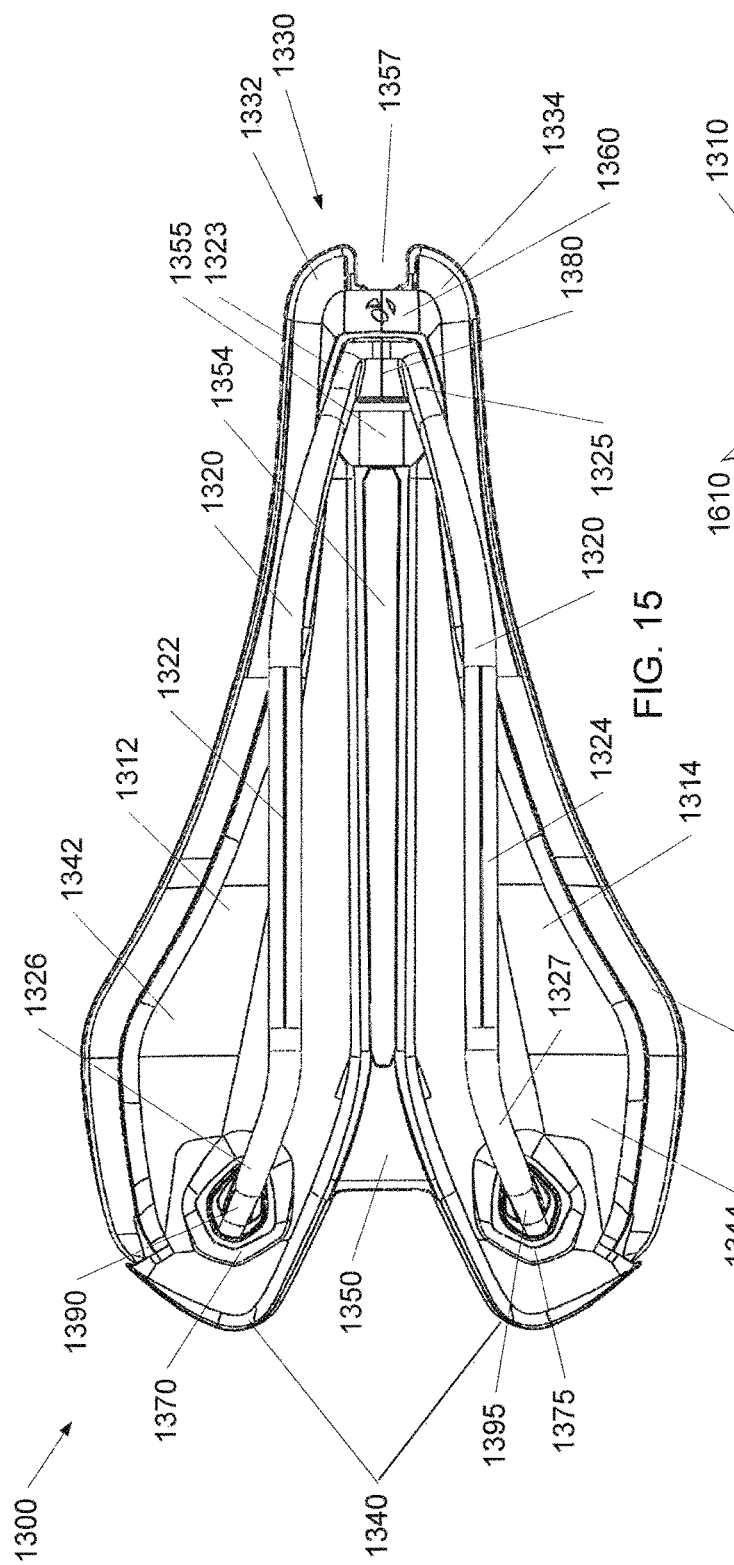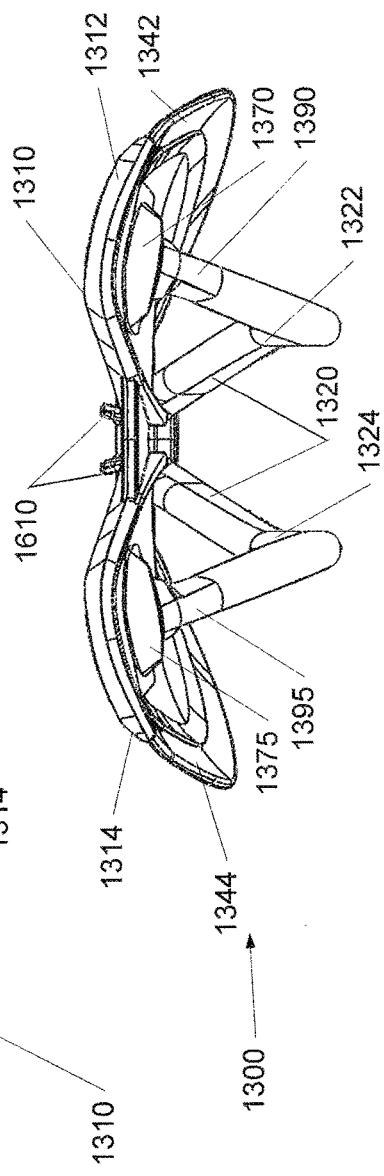

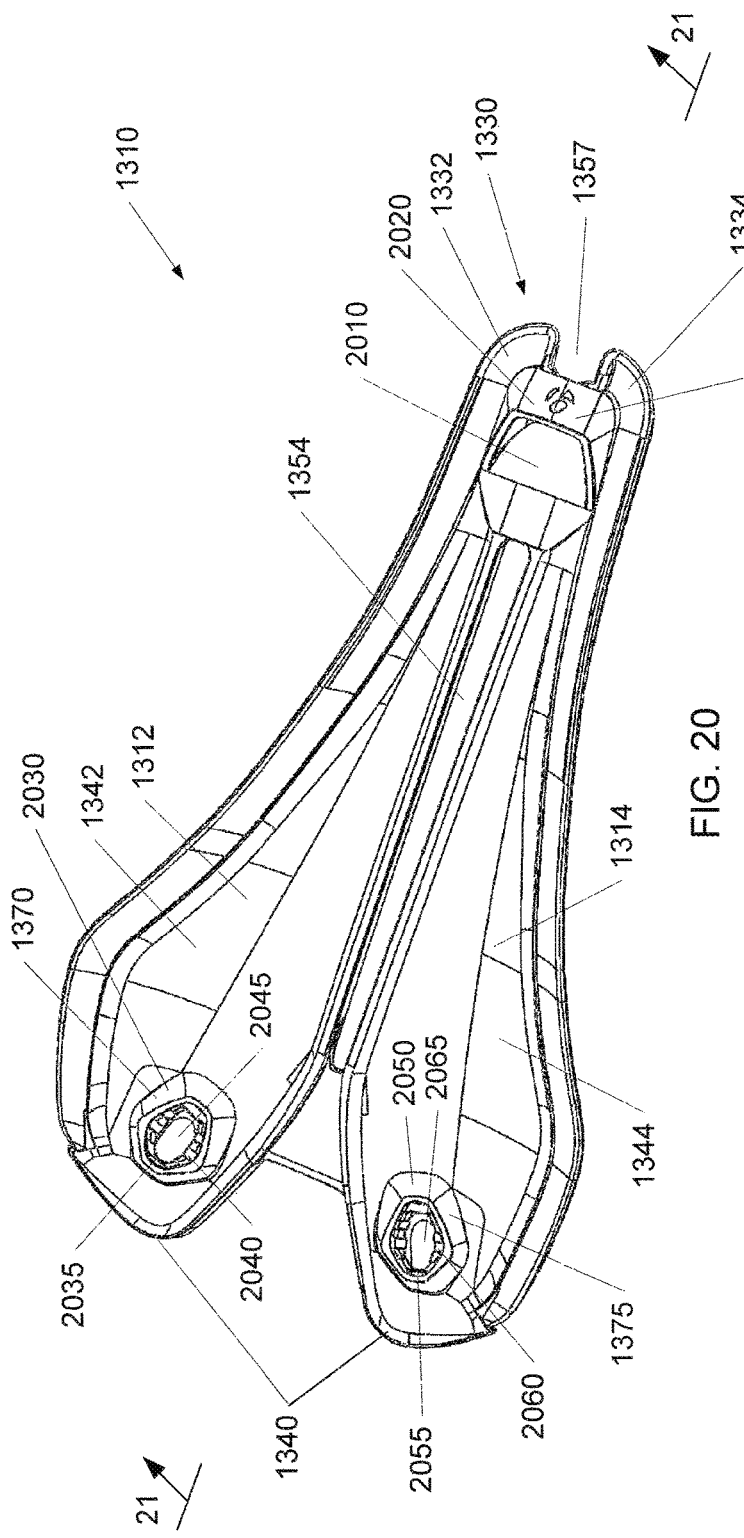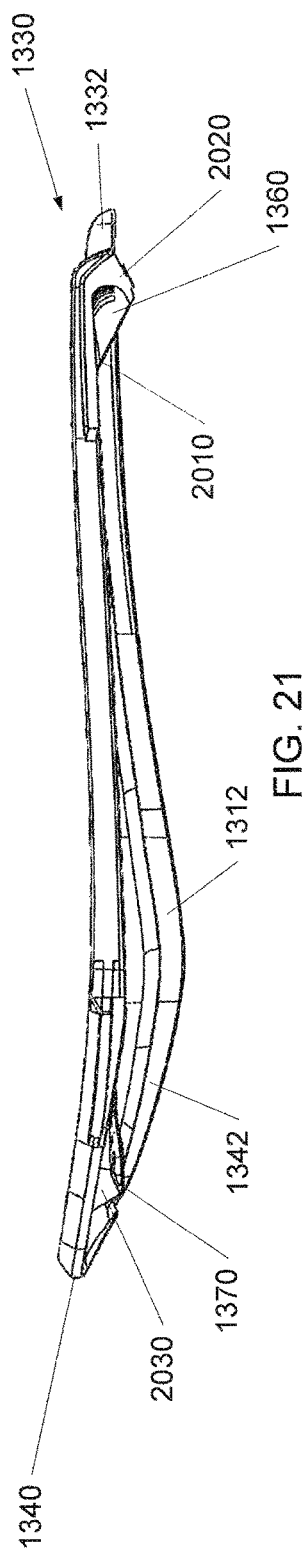

US 10,035,553 B2

LIGHTWEIGHT BICYCLE SEAT ASSEMBLIES

CROSS-REFERENCE TO RELATED PATENT APPLICATIONS

The present application is a continuation of U.S. patent application Ser. No. 14/329,742 that was filed Jul. 11, 2014, now U.S. Pat. No. 9,745,010 that was issued Aug. 29, 2017, the entire contents of which are hereby incorporated by reference; which claims priority to U.S. Provisional Application No. 61/845,276 that was filed Jul. 11, 2013, the entire contents of which are hereby incorporated by reference.

BACKGROUND

The present invention relates generally to bicycles and, more particularly, to lightweight abrasion resistant bicycle seats or saddle assemblies.

Many bicycle riders experience discomfort attributable to even moderate durations spent seated upon a bicycle seat. Seat comfort depends on many factors, among them, the compliance or firmness of the padding, the compliance or firmness of the saddle shell, the appropriate seating surface shape, rider anatomy, compliance and/or responsiveness to rider motion associated with pedal operation, and even individual rider preference. Further, saddles are subject to a tremendous amount of abrasion as a rider manipulates the bicycle.

Therefore, there is a need for a bicycle seat system that increases compliance of the saddle and enhances wear resistance of the saddle covering.

SUMMARY

One illustrative embodiment is related to a bicycle seat apparatus comprising at least one rail and a saddle shell. The at least one rail can include a first mounting portion. The first mounting portion can comprise an ankle. A cross section of a terminus of the ankle can be larger than a cross section of the at least one rail. The saddle shell can include at least one mounting cup configured to mate with the first mounting portion of the at least one rail. A cross section of a base of the at least one mounting cup can be larger than a cross section of the terminus of the ankle.

Another illustrative embodiment is related to a bicycle seat apparatus, comprising a saddle shell and a saddle cover. The saddle shell can be covered at least in part by a deformable material. The saddle cover can cover at least a portion of the deformable material. The saddle cover can include a first layer, a second layer, and a third layer. The first layer can comprise a thermoplastic polyurethane. The second layer can comprise a mesh. The third layer can include thermoplastic polyurethane.

Another illustrative embodiment is related to a method. The method can comprise fusing a saddle cover together and applying the saddle cover to a saddle. The saddle cover can include a first layer comprising thermoplastic polyurethane; a second layer including a mesh; and a third layer including thermoplastic polyurethane.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

FIG. 4 is a top plan view of the bicycle seat assembly shown in FIG. 2 in accordance with an illustrative embodiment.

FIG. 5 is a front elevation view of the seat assembly shown in FIG. 2 taken along line 5-5 shown in FIG. 4 in accordance with an illustrative embodiment.

FIG. 13 is a perspective view of a lightweight saddle base in accordance with an illustrative embodiment.

FIG. 14 is a side section view of the lightweight saddle base of FIG. 13 in accordance with an illustrative embodiment.

FIG. 15 is a bottom view of the lightweight saddle base of FIG. 13 in accordance with an illustrative embodiment.

FIG. 16 is a rear view of the lightweight saddle base of FIG. 13 in accordance with an illustrative embodiment.

FIG. 20 is a perspective view of the shell of FIG. 13 in accordance with an illustrative embodiment.

FIG. 21 is a side section view of the shell of FIG. 13 in accordance with an illustrative embodiment.

DETAILED DESCRIPTION OF THE ILLUSTRATIVE EMBODIMENTS

Figure 1:
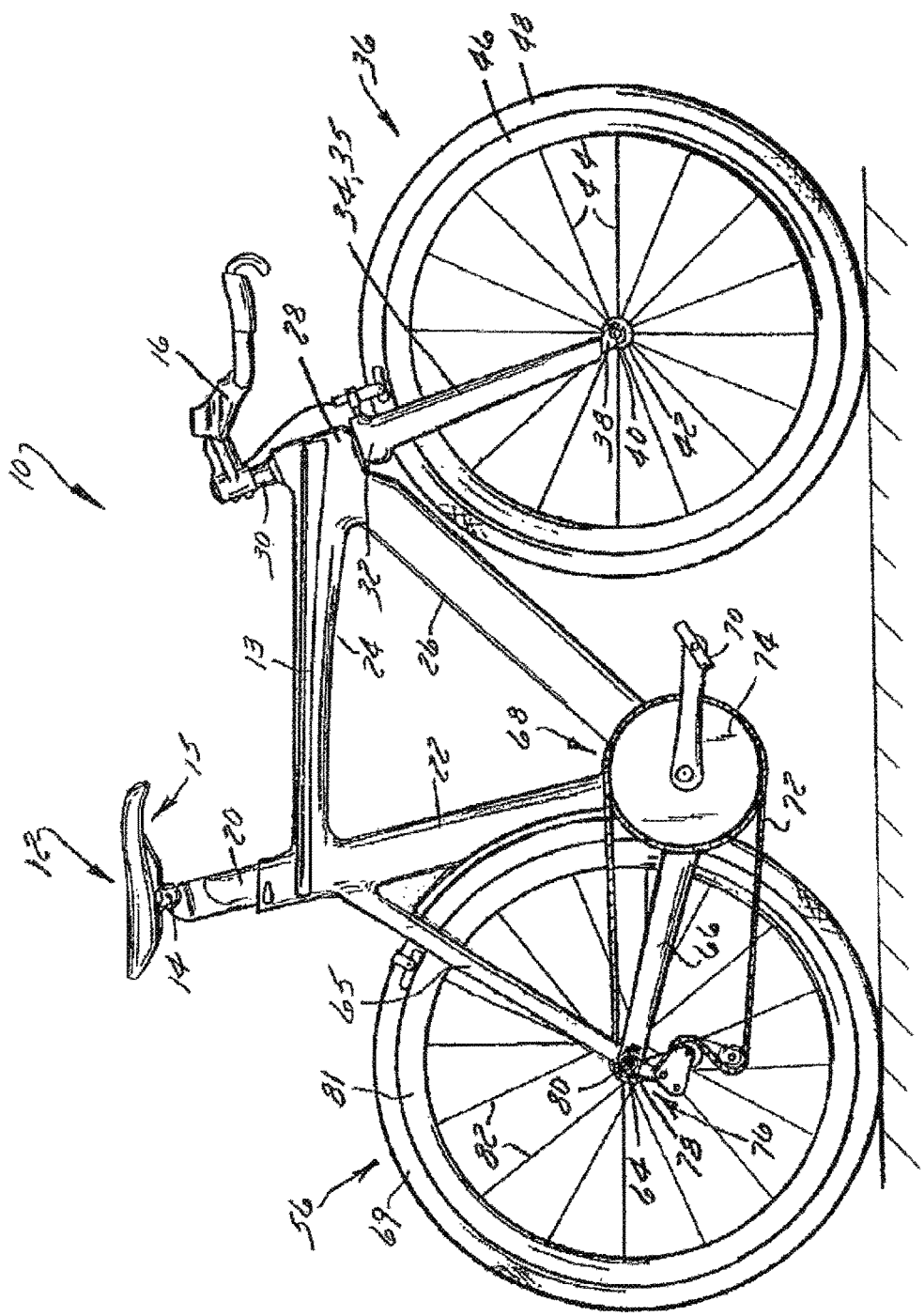
FIG. 1 is an elevational view of a bicycle equipped with an adjustable bicycle seat assembly in accordance with an illustrative embodiment.

FIG. 1 shows a bicycle 10 equipped with a bicycle seat or bicycle saddle assembly or simply seat assembly 12 that is constructed in accordance with the present invention. Bicycle 10 includes a frame 13 to which seat assembly 12 and handlebars 16 are attached. A seat clamp 14 is engaged with an underside 15 of seat assembly 12 and cooperates with a seat post 20 that slidably engages a seat tube 22 of frame 13. A top tube 24 and a down tube 26 extend forwardly from seat tube 22 to a head tube 28 of frame 13. Handlebars 16 are connected to a steerer tube 30 that passes through head tube 28 and engages a fork crown 32. A pair of forks 34, 35 extend from generally opposite ends of fork crown 32 and are constructed to support a front wheel assembly 36 at an end thereof or fork tip 38. Fork tips 38 engage generally opposite sides of an axle 40 that is constructed to engage a hub 42 of front wheel assembly 36. A number of spokes 44 extend from hub 42 to a rim 46 of front wheel assembly 36. A tire 48 is engaged with rim 46 such that rotation of tire 48, relative to forks 34, rotates rim 46 and hub 42.

A rear wheel assembly 56 is positioned generally concentrically about a rear axle 64. A seat stay 65 and a chain stay 66 offset rear axle 64 from a crankset 68. Crankset 68 includes pedals 70 that are operationally connected to a flexible drive such as a chain 72 via a chain ring or sprocket 74. Rotation of chain 72 communicates a drive force to a rear section 76 of bicycle 10 having a gear cluster 78 positioned thereat. Gear cluster 78 is generally concentrically orientated with respect to rear axle 64 and includes a number of variable diameter gears.

Gear cluster 78 is operationally connected to a hub 80 associated with a rear tire 69 of rear wheel assembly 56. A number of spokes 82 extend radially between hub 80 and a rim 81 that supports tire 69 of rear wheel assembly 56. As is commonly understood, rider operation of pedals 70 drives chain 72 thereby driving rear tire 69 which in turn propels bicycle 10. It is appreciated that bicycle 10 could be provided in either of a road bicycle of mountain or off-road or trail bicycle configuration. It is appreciated that each configuration includes features generally directed to the intended operating environment of the bicycle. For example, trail bicycles generally include more robust suspension and tire systems than road bicycles. It is further appreciated that the seat system of the present invention is equally applicable to stationary bicycles and/or other vehicles or devices configured to support a seated rider and constructed for generally cyclic and/or repeatable movement of a user's legs.

FIGS. 2-5 show seat assembly 12 removed from bicycle 10 and seat clamp 14 removed therefrom. Referring to FIGS. 2-5, seat assembly 12 includes an upper side or topside 84 that faces a rider when the rider is seated thereupon on bicycle 10. Seat assembly 12 includes a base 86 and a rail 87 that includes a first rail portion 88 and a second rail portion 90 that extend along opposite lateral sides of underside 15 of seat assembly 12. As explained further below, rail 87 is can be constructed as a one-piece or unitary body that is contoured to form both the left and right hand longitudinal portions of the rail. Rail 87 can extend a substantial portion of the longitudinal length of seat assembly 12. Regardless of the specific construction of rail 87, first and second rail portions 88, 90 cooperate with seat clamp 14 to secure seat assembly 12 to seat tube 20.

Seat assembly 12 includes a forward or nose portion 96, a rear portion 98, and opposite lateral side portions 100, 102. As used herein, the longitudinal direction or axis of assembly 12 is the longest axis of the respective structure or assembly whereas the lateral directions are those directions that are oriented in a crossing, and perpendicular direction within a horizontal plane associated with the longitudinal axis. It is further understood that the longitudinal axis of seat assembly 12 is aligned with a longitudinal axis or axis aligned with the direction of operation of bicycle 10 when the seat assembly is attached thereto and the lateral directions of seat assembly 12, as determined from the longitudinal axis, are oriented toward the opposite left and right hand sides of the bicycle as determined by a rider positioned for operation of bicycle 10.

Figure 2:
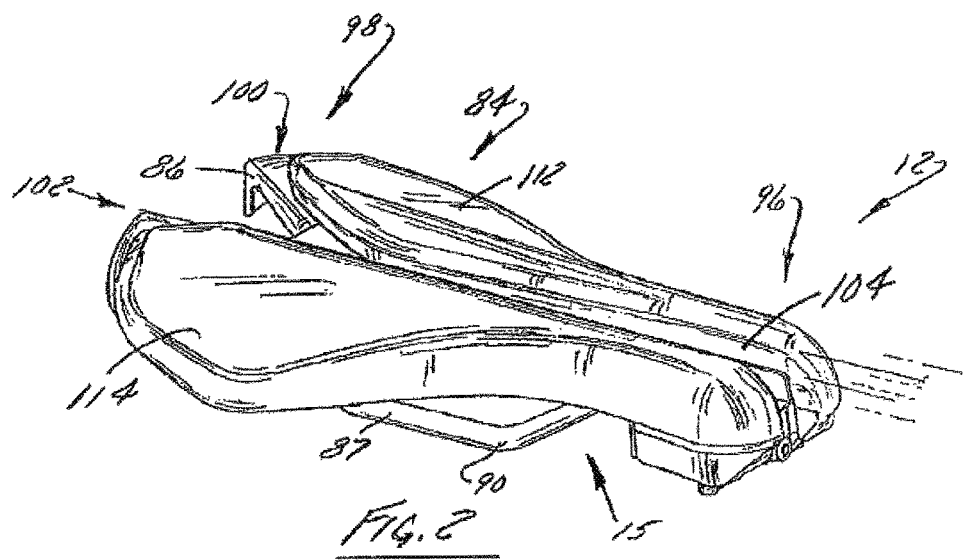
FIG. 2 is a top side perspective view of the bicycle seat assembly shown in FIG. 1 with the seat assembly removed from the bicycle in accordance with an illustrative embodiment.

As shown in FIGS. 2, 4, and 5 side portions or left hand side portion 100 and right hand side portion 102 of seat assembly 12 extend along a longitudinal length, indicated by axis 106, of seat assembly 12. Left and right hand side portions 102 are spaced apart and shaped to define a groove 104 that extends along a longitudinal length 106 of seat assembly 12. Groove 104 can extend the entire length of seat assembly 12. Left side portion 100 and right side portion 102 each include a pad 112, 114 that extends along base 86 in a generally upward direction to more completely define or increase the vertical depth associated with groove 104. Pads 112, 114 are can be constructed of a softer and/or more pliable material than base 86 to provide a more comfortable rider interaction with seat assembly 12. Pads 112, 114 can be constructed to include a cover layer and one or more overlapping or discrete padding layers. In one embodiment, the pads can be covered with a composite thermoplastic polyurethane (TPU) laminate as described below. The TPU laminate can include a first layer of thermoplastic polyurethane, a second layer of a mesh; and a third layer of thermoplastic polyurethane.

Figure 3:
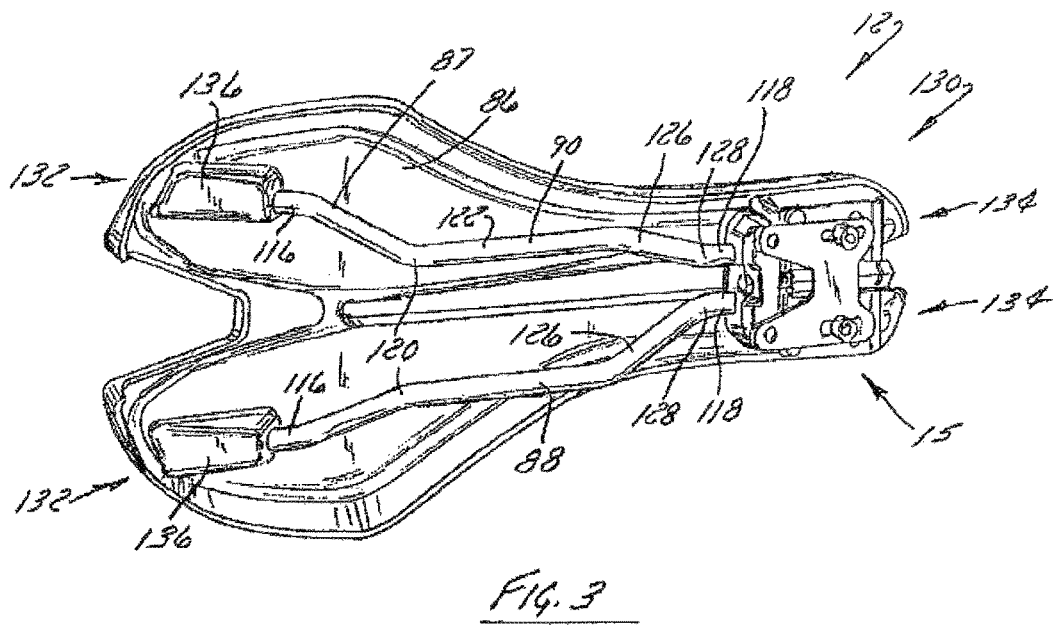
FIG. 3 is a bottom side perspective view of the seat assembly shown in FIG. 2 in accordance with an illustrative embodiment.

Referring to FIG. 3, the alternate lateral portions 88, 90 of rail 87 each include a rearward directed end portion 116 and a forward directed end portion 118. A first section 120 of each rail portion 88, 90 tapers forward and slightly inward of rearward end portion 116. A second section 122 extends forward from each first section 116 and is generally in parallel alignment with longitudinal axis 106 (FIG. 4) of seat assembly 12. The second section 122 of each rail portion 88, 90 extends along a portion of underside 15 of seat assembly 12 and is offset outward from base 86 and is offset to generally opposite lateral sides of longitudinal axis 106 of seat assembly 12. The second section 122 of each rail portion 88, 90 is positioned to generally cooperate with seat clamp 14, shown in FIG. 1, for securing seat assembly 12 to seat post 20.

The alternate lateral portions 88, 90 of rail 87 each include a third section 126 that is positioned forward of each second section 122. Each third section 126 is inclined toward base 86 and toward the longitudinal axis 106 with respect to a forward direction of seat assembly 12. Each rail portion 88, 90 includes a fourth section 128 that extends forward of the third section 126. Each fourth section 128 is secured to base 86 of seat assembly 12 by a forward rail mount assembly 130. Fourth sections 128 can be interconnected so as to form a unitary continuous rail between alternate end portions 116.

As explained further below, forward rail mount assembly 130 is constructed to securely engage rail 87 and base 86 of seat assembly 12 but is also constructed to allow the lateral displacement of the nose portion of the alternate left and right hand side portions 100, 102 of seat assembly 12 relative to one another. As shown in FIG. 3, first, second, third, and fourth sections 120, 122, 126, 128 of each rail portion 88, 90 of rail 87 transitions from an outboard location 132 at the rear of seat assembly 12 to a more inboard location 134 toward the front of seat assembly 12 and nearer interaction with rail mount assembly 130. Such a construction provides for the gradual tapering of the shape of seat 12 in the fore and aft directions thereby defining the broader rear portion and the narrower nose portion of seat assembly 12 and facilitates a controlled pitching of seat assembly 12 during rider operation of pedals 70 of bicycle 10.

Still referring to FIG. 3, base 86 of seat assembly 12 includes aft cavities 136 that engage the alternate rear ends 116 of rail 87 associated with each rail portion 88, 90 thereby securing the rear end of each rail portion 88, 90 to base 86 at a desired position. It is appreciated that rear ends 116 could be captured during an integral formation of base 86 thereabout or simply connected to base 86. It is further appreciated that base 86 and rail 87 may be constructed of the same or different materials. That is, base 86 and rail 87 may be constructed of various metal, composite, or plastic materials. As mentioned above, base 86 is constructed such that rail 87 is attached or constructed to cooperate with base 86 so as to encourage base 86 to "roll" during a pedaling operation. That is, base 86 and rail portions 88, 90 are constructed such that the rails deflect in response to shifting rider weight associated with pedaling. Accordingly, seat assembly 12 is constructed to be responsive to rider loading so as to maintain a generally normal orientation of the respective lateral sides of seat 12 to the rider's anatomy. Such deflection, in cooperation with groove 104, ensures reduced compression of the riders deformable areas commonly attributed to interaction with a non-pliable seat during pedaling operations.

Figure 6:
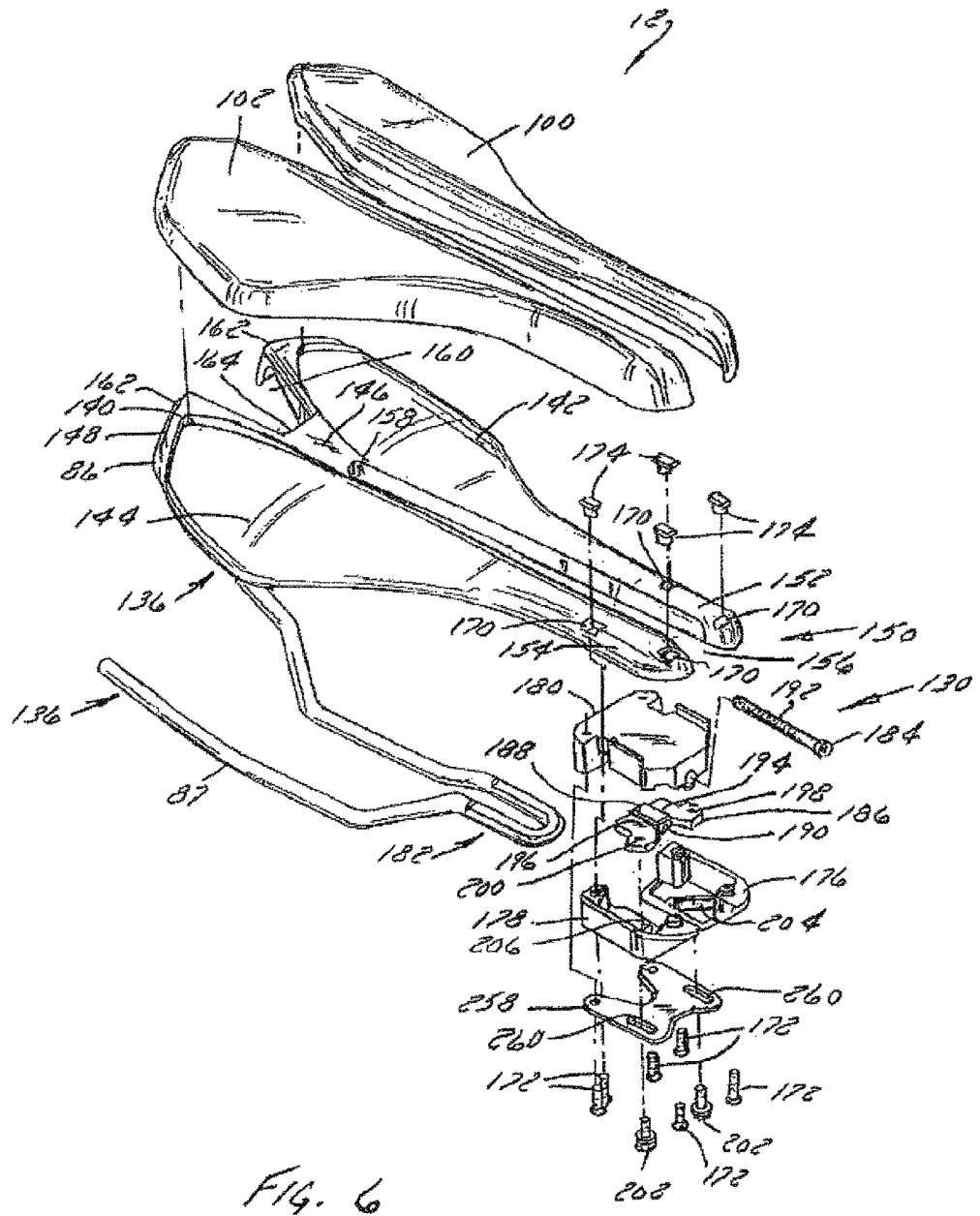
FIG. 6 is an exploded view of the bicycle seat assembly shown in FIG. 2 in accordance with an illustrative embodiment.

FIG. 6 shows an exploded view of seat assembly 12. Respective seat pads 100, 102 are exploded from seat base 86. Seat base 86 is formed as a one-piece body 140 having alternate left 142 and right 144 side portions. Side portions 142, 144 of base 86 extend in the longitudinal direction generally aligned and offset in the opposite lateral directions from longitudinal axis 106 of seat assembly 12. A web wall 146 extends in a lateral direction between the alternate side portions 142, 144 of base 86. Web wall 146 can be located nearer a rearward end 148 of base 86 than a forward end 150 thereof. Web wall 146 is constructed to accommodate lateral movement of a left-hand nose portion 152 relative to a right-hand nose portion 154 of base 86 in response to adjustment of forward rail mount assembly 139.

An elongated groove or channel 156 is formed between side portions 142, 144 of base 86. Channel 156 extends from a forward tip of nose portion 152 of base 86 to a forward facing edge 158 of web wall 146. A recess 160 is formed between rearward portions of alternate side portions 142, 144 of base 86 and extends between a rearward edge 162 of alternate side portions 142, 144 of base 86 and a rear facing wall 164 of web wall 146 of base 86. Recess 160 accommodates the scissors-like motion of side portions 142, 144 of base 86 about web wall 146 associated with manipulation of forward rail mount assembly 130 as explained further below.

Each of left and right-hand nose portions 152, 154 of base 86 include a number of passages 170 that are shaped to receive one or more fasteners 172 and corresponding nuts 174. Fasteners 172 and nuts 174 cooperate with one another and a respective mount body to secure left and right hand mount bodies 176, 178 to a respective alternate lateral nose portion 152, 154 of base 86. Forward rail mount assembly 130 includes a housing or a forward rail garage 180 that is fixedly secured to a forward portion 182 of rail 87. An adjuster or actuator 184 is rotationally supported by rail garage 180 and operatively engaged with a shuttle body or simply a shuttle 186 that is slidably positioned with respect to garage 180.

Referring to FIGS. 6-9, shuttle 186 includes a center portion 188 having a threaded bore 190 that is configured to rotationally cooperate with a threaded portion 192 of actuator 184. Shuttle 186 includes a first arm 194 and the second arm 196 that extend an opposite lateral directions relative to center bore 190. Each arm includes a passage 198, 200 that is constructed to receive a pin or a post 202 that slidably cooperates with a channel 204, 206 formed in each of the respective mount bodies 176, 178. As explained further below with respect to FIGS. 7-12, rotation of actuator 184 relative to rail garage 180 translates shuttle 186 in a longitudinal direction along the axis of actuator 184 and along the longitudinal axis 106 of seat assembly 12 such that the interaction between posts 202 and grooves 204, 206 translates each of mount bodies 176, 178 of forward rail mount assembly 130 relative to rail garage 180 and seat rail 87 in opposite laterally inward and outward directions. Said another way, operation of actuator 184 manipulates the position of nose portion 152 of seat assembly 12 relative to the position of nose portion 154 of seat assembly 12 in a lateral direction and thereby manipulates the width associated with channel 156 and groove 104. It is further appreciated that each of the left side nose portion and the right side nose portion of saddle assembly 12 are concurrently moveable, and experience the same relative degree of translation during manipulation of actuator 184, relative to longitudinal axis 106 of seat assembly 12.

Figure 7:
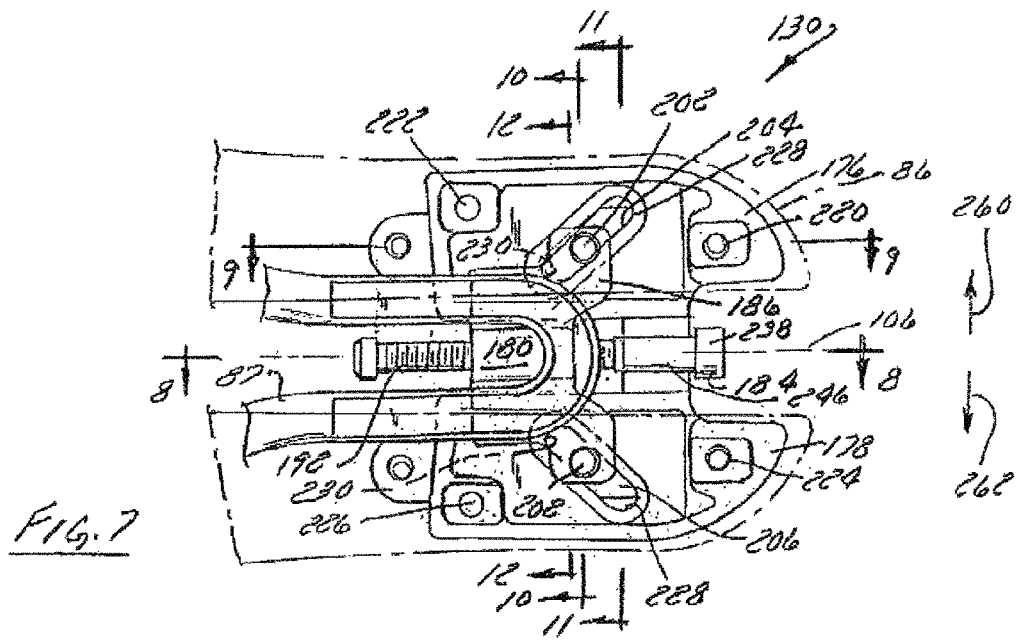
FIG. 7 is bottom plan view of a front rail mount portion of the seat assembly shown in FIG. 2 with a lower plate shown in FIG. 3 removed therefrom in accordance with an illustrative embodiment.
Figure 8:
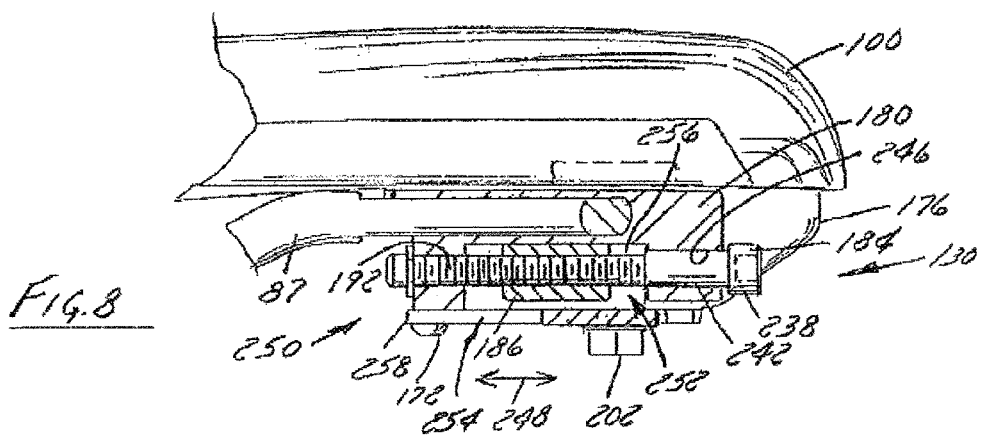
FIG. 8 is a longitudinal cross section view of the front rail mount assembly taken along line 8-8 shown in FIG. 7 in accordance with an illustrative embodiment.
Figure 9:
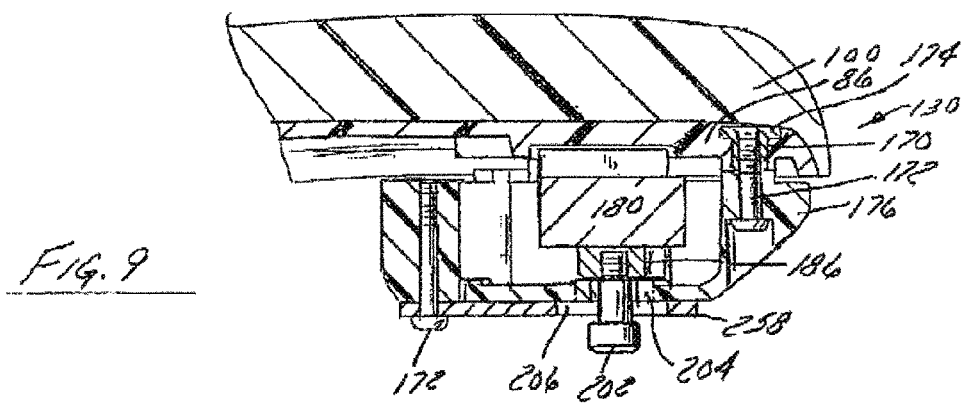
FIG. 9 is a longitudinal cross section view of the front rail mount assembly taken along line 9-9 shown in FIG. 7 in accordance with an illustrative embodiment.

FIGS. 7-9 show various cross-sectional views of forward seat mount assembly 130. Left and right hand mount bodies 176, 178 each include a number of openings 220, 222, 224, 226 that are configured to secure the alternate mount bodies 176, 178 relative to the underside of a respective nose portion 152, 154 of base 86. It is appreciated that such an arrangement is but one means for securing mount bodies 176, 178 relative to the nose portions of base 86. It is further appreciated that mount bodies 176, 178 could be formed integrally with base 86 so as to extend from the underside thereof.

Regardless of the connection modality between base 86 and mount bodies 176, 178, each groove 204, 206 formed in each respective mount body 176, 178 includes a forward facing end 228 and a rearward facing end 230. Forward facing ends 228 are oriented more forward relative to longitudinal axis 106 and more laterally outboard relative to a respective rearward end 230 of the corresponding groove. Each post 202 is securely and fixedly positioned with respect to shuttle 186 but slidably cooperates with a groove 204, 206 associated with a respective mount body 176, 178.

Actuator 184 includes a head portion 238 that is configured to cooperate with a driving tool, such as a hex wrench via a cavity 240 (FIG. 5), or other suitable rotationally driving arrangement. Actuator 184 includes a shank 242 that rotationally cooperates with a passage 246 (FIG. 8) formed in rail garage 180. Actuator 184 is associated with rail garage 180 to allow rotational operation of actuator 184 without altering the longitudinal association between actuator 184 and rail garage 180.

Shuttle 186 threadably cooperates with a threaded portion 192 of actuator 184 such that rotation of actuator 184 translates shuttle 186 in the longitudinal direction, indicated by arrow 248 (FIG. 8) relative to rail garage 180 and rail 87 and thereby altering the longitudinal position of posts 202 relative to rail 87 and rail garage 180. A rearward end 250 of actuator 184 cooperates with rail garage 180 so as to be rotationally supported thereat. As shown in FIG. 8, shuttle 186 is moveable between a forward position 252 and a rearward position 254 upon rotation of actuator 184 and is accommodated in a cavity 256 defined by the cooperation of rail garage 180 and a base plate 258.

As shown in FIG. 9, plate 258 includes elongated channels 260 that extend in a longitudinal direction generally aligned with longitudinal axis 106 of seat assembly 12. Channels 260 are offset in the opposite lateral directions relative to axis 106 so as to be aligned with a longitudinal axis associated with translation of post 202 during movement of shuttle 186. Referring back to FIG. 7, operation of actuator 184 translates shuttle 186 in a longitudinal direction aligned with axis 106. Posts 202 are secured to arms 194, 196 of shuttle 186 such that posts 202 also translate in only a longitudinal direction that is parallel to the axis of operation of actuator 184. Unlike grooves 260 associated with plate 258, grooves 204, 206 associated with the alternate lateral side seat base mount bodies 176, 178 include a lateral component such that the longitudinal translation of posts 202 can be converted to lateral translation, indicated by arrows 260, 262 (FIG. 7), of respective seat base mount bodies 178, 176 during rotation of actuator 184.

Figure 10:
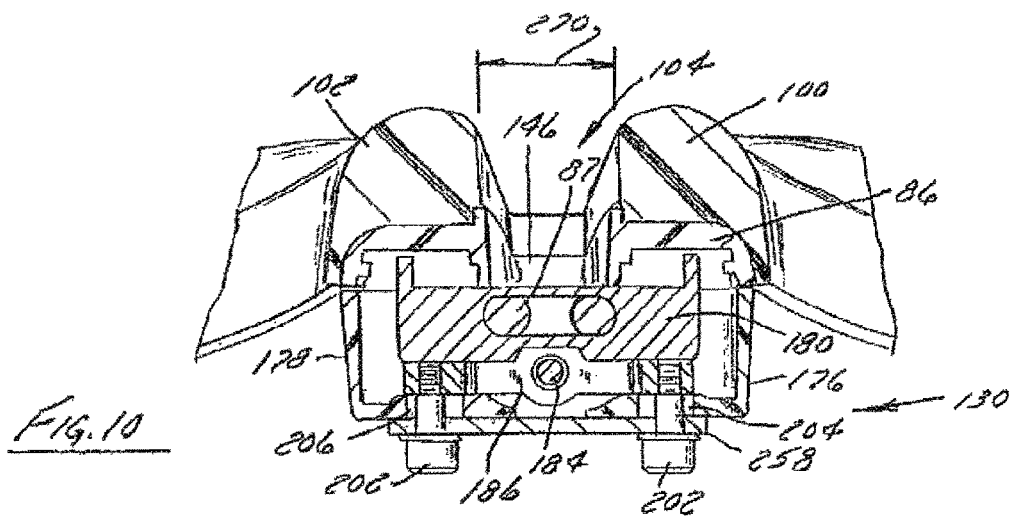
FIG. 10 is lateral cross section view of the front rail mount assembly taken along line 10-10 in FIG. 7 with the shuttle body in an intermediate position in accordance with an illustrative embodiment.
Figure 11:
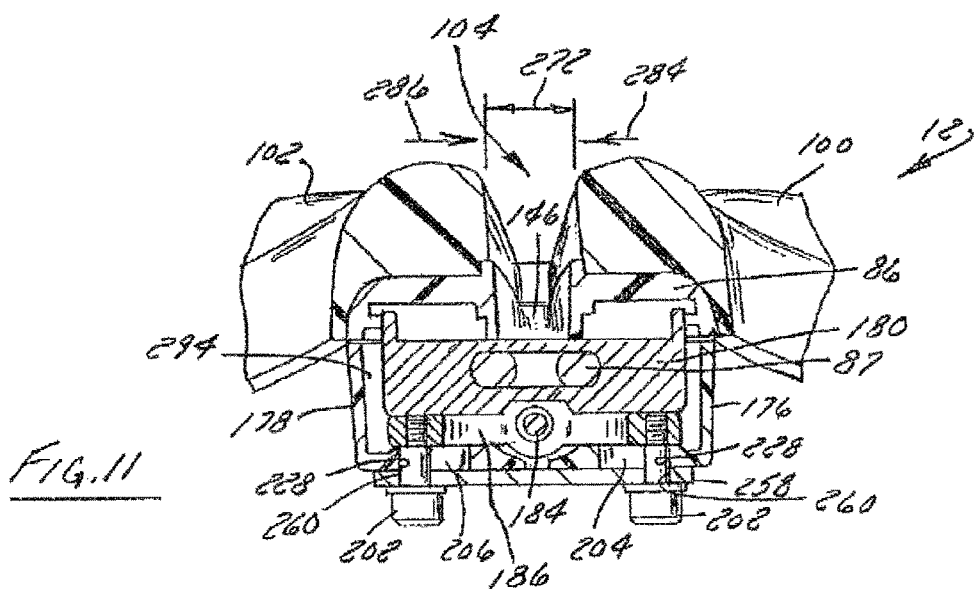
FIG. 11 is a view similar to FIG. 10 taken along ling 11-11 in FIG. 7 and shows the shuttle body adjusted to a forward position so that nose portion of the seat assembly attains a narrowest orientation in accordance with an illustrative embodiment.
Figure 12:
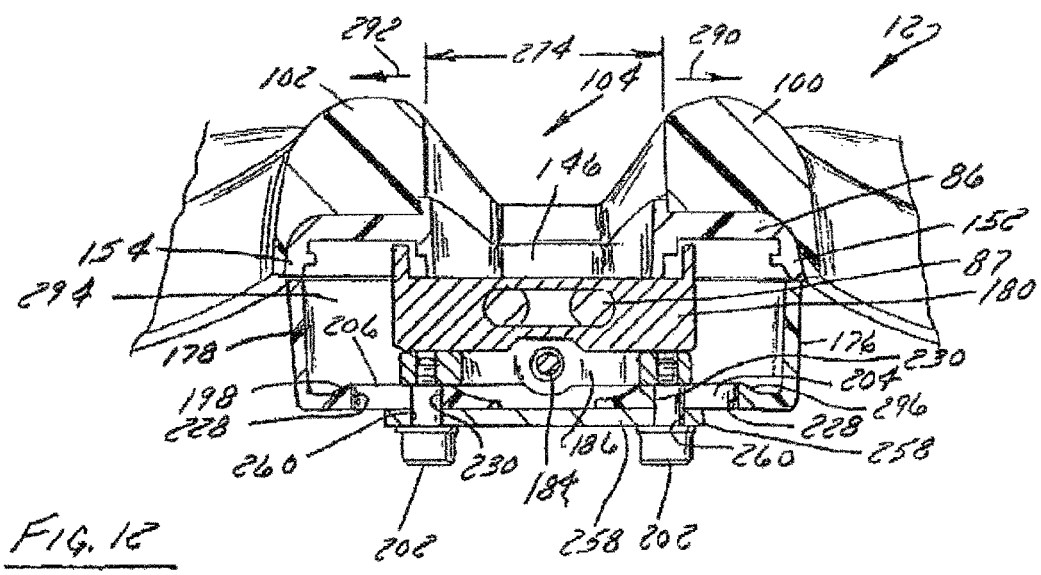
FIG. 12 is a view similar to FIG. 10 taken along line 12-12 and shows the shuttle body adjusted to the rearward position so that nose portion of the seat assembly attains a widest orientation in accordance with an illustrative embodiment.

FIGS. 10-12 show various nose width configurations that can be achieved with forward rail mount assembly 130. FIG. 10 shows an intermediary width 270 associated with gap 104, FIG. 11 shows a narrowest width 272 associated with gap 104, and FIG. 12 shows a widest width associated with gap 104 attainable via user manipulation of actuator 184. As shown in FIG. 11, when shuttle body 186 is adjusted to a fully forward position relative to rail garage 180, posts 202 are displaced toward the forward end of grooves 260 formed in plate 258 as well as the forward ends 228 of grooves 204, 206 associated with respective mount bodies 176, 178. Said another way, as shuttle body 186 is translated in the longitudinal forward direction, mount bodies 176, 178 translate in an inward lateral direction, indicated by arrows 284, 286 (FIG. 11) toward longitudinal centerline 106 the saddle assembly 12.

Inversely, manipulation of actuator 184 in a counterclockwise rotational direction translates shuttle 186 in a rearward direction along a longitudinal axis 106 thereby translating posts 202 toward a rearward end 230 of grooves 204, 206. The rearward translation of posts 202 translates mount bodies 176, 178, and thereby nose portions 152, 154 of base 86, in opposite laterally outward or outboard directions, indicated by arrows 290, 292, (FIG. 12) respectively. Comparing FIGS. 11 and 12, it is shown that the inward lateral positioning of mount bodies 176 178 provides a small spacing 294 between the respective mount body 176, 178 and a respective alternate lateral side of rail garage 180, as shown in FIG. 11, whereas outward lateral positioning of mount bodies 176, 178 increases the size of spacing 294 during the outward lateral translation of mount bodies 176, 178 as shown in FIG. 12.

Still referring to FIGS. 11 and 12, plate 258 is constructed to be secured to rail garage 180 such that shuttle 186 and a flange 296, 298 of each of mount body 176, 178 can be slidably positioned between plate 258 and rail garage 180. Shuttle 186 translates in the solely longitudinal in a direction aligned with axis 106 between rail garage 180 and plate 258 whereas the flange 296, 298 of each mount body translates in opposite lateral directions, indicated by arrows 284, 286, 290, 292, relative to shuttle body 186, rail garage 180, and plate 258. Such a construction allows slidable but non-interfering engagement between shuttle 186 and flanges 296, 298 of each respective mount body 176, 178 while plate 258 protects the moveable operation of seat rail mount assembly 130.

Therefore, one illustrative embodiment includes an adjustable width bicycle seat assembly that includes a housing secured to a seat rail. A shuttle body is slidably positioned with respect to the housing and the seat rail. An adjuster is engaged between the housing and the shuttle body such that rotation of the adjuster translates the shuttle body relative to the housing along an axis of rotation of the adjuster. A mount body that is constructed to be secured to a portion of a saddle shell is engaged with the adjuster such that rotation of the adjuster translates the mount body and the portion of the saddle shell in a direction that crosses the axis of rotation of the adjuster. The saddle shell can be covered in part with a deformable material such as foam. At least a portion of the foam can be covered with a TPU laminate.

Referring now to FIG. 13, a perspective view of a lightweight saddle base 1300 in accordance with an illustrative embodiment is shown. Referring to FIG. 14, a side section view of the lightweight saddle base 1300 of FIG. 13 in accordance with an illustrative embodiment is shown. Referring to FIG. 15, a bottom view of the lightweight saddle base 1300 of FIG. 13 in accordance with an illustrative embodiment is shown. Referring to FIG. 16, a rear view of the lightweight saddle base 1300 of FIG. 13 in accordance with an illustrative embodiment is shown. The lightweight saddle base 1300 can include a shell 1310 and rail 1320.

The shell 1310 can form the basic shape of the saddle. The shell 1310 can include a nose portion 1330 and a rear portion 1340. The shell 1310 can include a first side portion 1312 and a second side portion 1314. The first side portion 1312 can include a first nose portion 1332 and a first rear portion 1342. The second side portion 1314 can include a second nose portion 1334 and a second rear portion 1344.

In one illustrative embodiment, the first side portion 1312 and the second side portion 1314 can be connected by a first web wall 1350 and a second web wall 1355. In another illustrative embodiment, the first side portion 1312 and the second side portion 1314 can be connected only by the first web wall 1350, as described above. In another illustrative embodiment, the shell 1310 can be a continuous single shape or any other saddle shape. In one illustrative embodiment, the first web wall 1350 and the second web wall 1355 can be living hinges, i.e., the web walls can flex. The first web wall 1350 and the second web wall 1355 can be designed to allow a predetermined amount of flex, for example, by changing thickness and length, and adding stiffeners such as ribs, directional fiber, and fiber chop. The first side portion 1312 and the second side portion 1314 can be separated by a rear groove 1352, a center groove 1354, and a nose groove 1357. The first web wall 1350 and the second web wall 1355 can be separated by the center groove 1354. The rear groove 1352, the center groove 1354, and the nose groove 1357 can include reinforcement ribs 1610.

In one illustrative embodiment, the shell 1310 can be about 246 mm long and 134 mm wide, however, any length and widths could be used. In one illustrative embodiment, the first web wall 1350 can be about 27 mm long, the second web wall 1355 can be about 40 mm long, the rear groove 1352 can be about 31 mm long, the center groove 1354 can be about 134 mm long, and the nose groove 1357 can be about 9 mm long, however, any length and widths could be used. In another illustrative embodiment, the first web wall 1350 can be about 5 mm-100 mm long, the second web wall 1355 can be about 5 mm-100 mm long, the rear groove 1352 can be about 0 mm-100 mm long, the center groove 1354 can be about 5 mm-200 mm long, and the nose groove 1357 can be about 0 mm-150 mm long, however, any length and widths could be used.

The shell 1310 can include a front mounting cup 1360, a first rear mounting cup 1370, and a second rear mounting cup 1375, as described further below. The front mounting cup 1360, the first rear mounting cup 1370, and the second rear mounting cup 1375 can be configured to accept or capture the rail 1320.

In one embodiment, the shell 1310 can be made of a fiber reinforced nylon. The fiber reinforced nylon can be molded. In another embodiment, the shell 1310 can be made of a fiber reinforced plastic. The fiber can be a carbon fiber. In other embodiments, fibers such as aramid (e.g., Kevlar™), fiberglass, boron fibers, ceramic fibers, nylon, or any other fiber can be used. The fiber can be a combination of fibers. The fibers can be of various lengths. A resin system of the fiber reinforced plastic can be, for example, an epoxy. The resin can be fortified with particulate, nanotubes, fibers, and nanostructures. In one embodiment, the fiber reinforced plastic can be a thermoset. In another embodiment, the fiber reinforced plastic can be a thermoplastic. The fiber reinforced plastic can include bismaleimide, polyphenylene sulfide, polyetherimide, polyamide, polyetheretherketone, polystyrene, nylon, polypropylene, polyethylene, vinyls, acrylics, and/or polycarbonates. In another embodiment, the shell 1310 can be made of any other material, including metal.

The rail 1320 can include a first support portion 1322 and a second support portion 1324. A first front 1323 of the first support portion 1322 and a second front 1325 the second support portion 1324, respectively, can be coupled by a front rail mounting portion 1380. The front rail mounting portion 1380 can be configured to seat in or mate with the front mounting cup 1360. The front rail mounting portion 1380 can be bonded to the front mounting cup 1360 with an adhesive such as epoxy. In another embodiment, the first support portion 1322 and the second support portion 1324 can have separate mounting portions and separate front mounting cups, for example, a first front mounting cup on the first nose portion 1332 and a second front mounting cup on the second nose portion 1334. A first rear 1326 of the first support portion 1322 can include a first rear rail mounting portion 1390. The first rear rail mounting portion 1390 can be configured to seat in or mate with the first rear mounting cup 1370. The first rear rail mounting portion 1390 can be bonded to the first rear mounting cup 1370 with an adhesive such as epoxy. A second rear 1326 of the second support portion 1324 can include a second rear rail mounting portion 1395. The second rear rail mounting portion 1395 can be configured to seat in or mate with the second rear mounting cup 1375. The second rear rail mounting portion 1395 can be bonded to the second rear mounting cup 1375 with an adhesive such as epoxy.

An angle between the first front 1323 of the first support portion 1322 and a bottom of the first nose portion 1332 can be greater than 15 degrees. An angle between the second front 1325 of the second support portion 1324 and a bottom of the second nose portion 1334 can be greater than 15 degrees. An angle between the first rear 1326 of the first support portion 1322 and a bottom of the first rear portion 1342 of the first side portion 1312 can be greater than 15 degrees. An angle between the second rear 1327 of the second support portion 1324 and a bottom of the second rear portion 1344 of the second side portion 1314 can be greater than 15 degrees.

In another embodiment, an angle between the first front 1323 of the first support portion 1322 and a bottom of the first nose portion 1332 can be greater than 20 degrees. An angle between the second front 1325 of the second support portion 1324 and a bottom of the second nose portion 1334 can be greater than 20 degrees. An angle between the first rear 1326 of the first support portion 1322 and a bottom of the first rear portion 1342 of the first side portion 1312 can be greater than 20 degrees. An angle between the second rear 1327 of the second support portion 1324 and a bottom of the second rear portion 1344 of the second side portion 1314 can be greater than 20 degrees.

In another embodiment, an angle between the first front 1323 of the first support portion 1322 and a bottom of the first nose portion 1332 can be in a range from about 15 degrees to about 45 degrees. An angle between the second front 1325 of the second support portion 1324 and a bottom of the second nose portion 1334 can be in a range from about 15 degrees to about 45 degrees. An angle between the first rear 1326 of the first support portion 1322 and a bottom of the first rear portion 1342 of the first side portion 1312 can be in a range from about 15 degrees to about 65 degrees. An angle between the second rear 1327 of the second support portion 1324 and a bottom of the second rear portion 1344 of the second side portion 1314 can be in a range from about 15 degrees to about 65 degrees.

In one embodiment, the rail 1320 can be made of a fiber reinforced nylon. The fiber reinforced nylon can be molded. In another embodiment, the rail 1320 can be made of a fiber reinforced plastic. The fiber can be a carbon fiber. In other embodiments, fibers such as aramid (e.g., Kevlar™), fiberglass, boron fibers, ceramic fibers, nylon, or any other fiber can be used. The fiber can be a combination of fibers. The fibers can be of various lengths. A resin system of the fiber reinforced plastic can be, for example, an epoxy. The resin can be fortified with particulate, nanotubes, fibers, and nanostructures. In one embodiment, the fiber reinforced plastic can be a thermoset. In another embodiment, the fiber reinforced plastic can be a thermoplastic. The fiber reinforced plastic can include bismaleimide, polyphenylene sulfide, polyetherimide, polyamide, polyetheretherketone, polystyrene, nylon, polypropylene, polyethylene, vinyls, acrylics, and/or polycarbonates. In another embodiment, the rail 1320 can be made of steel, titanium, aluminum, magnesium, or any other material. The rail 1320 can be hollow or solid, and composed of multiple layers of varying materials. The rail 1320 can be any shape and have any cross section such as a circle, oval, triangle, square, or I-beam. The rail 1320 can be about 7 mm in diameter; however, the rail 1320 can have any diameter.

The position and structure of the front mounting cup 1360, the first rear mounting cup 1370, and the second rear mounting cup 1375 can be predetermined to provide a predetermined saddle compliance. For example, the front mounting cup 1360, the first rear mounting cup 1370, and the second rear mounting cup 1375 can be moved farther apart to increase compliance.

In a typical high performance saddle, lightweight materials can be used; however, traditional construction techniques are used. For example, the end of a rail must be run parallel with the shell for a distance to provide an area for attachment. Advantageously, the rails of the lightweight saddle base 1300 can terminate to the shell at a steeper angle reducing the amount of material needed for a connection. Advantageously, the lightweight saddle base 1300 can use less material than a typical high performance saddle saving about 90 g of weight. Advantageously, the shell 1310 does not require additional machining to accept the rails thereby reducing manufacturing costs.

Figure 17:
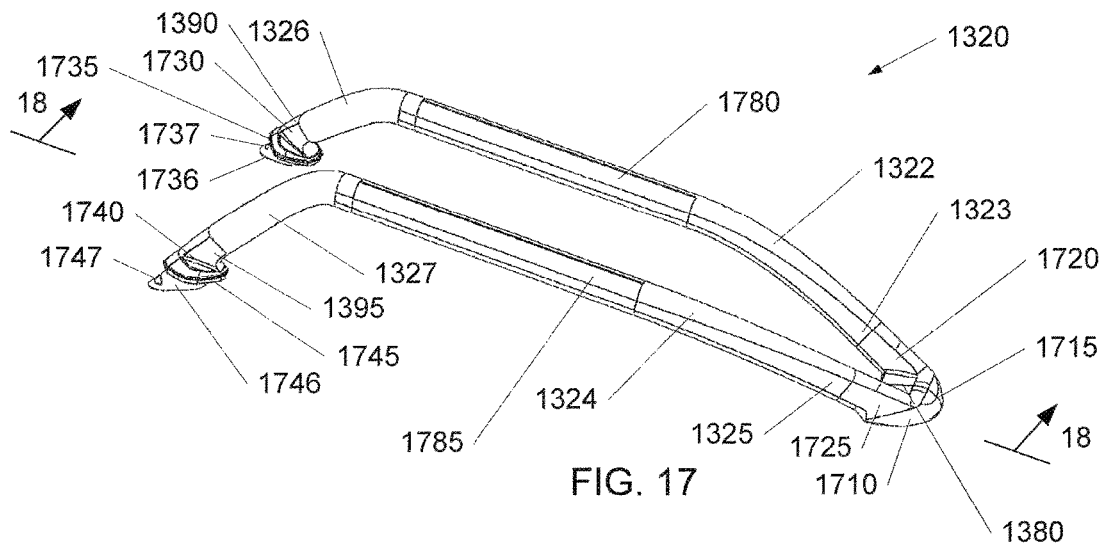
FIG. 17 is a perspective view of the rail of FIG. 13 in accordance with an illustrative embodiment.
Figure 18:
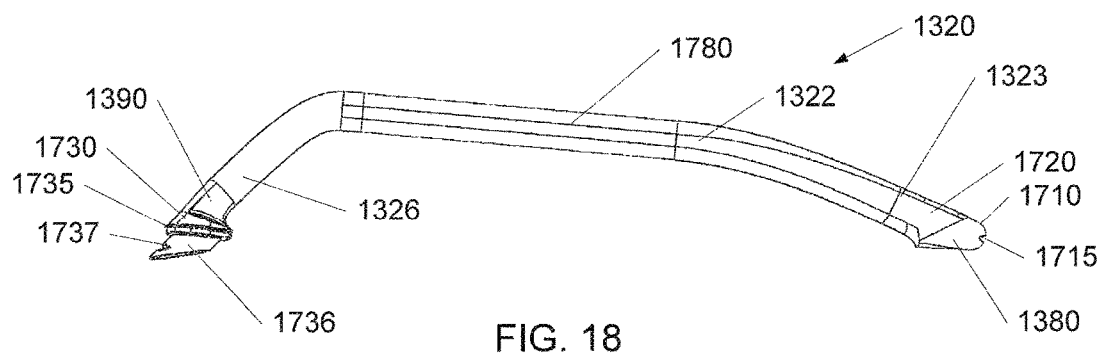
FIG. 18 is a side section view of the rail of FIG. 13 in accordance with an illustrative embodiment.
Figure 19:
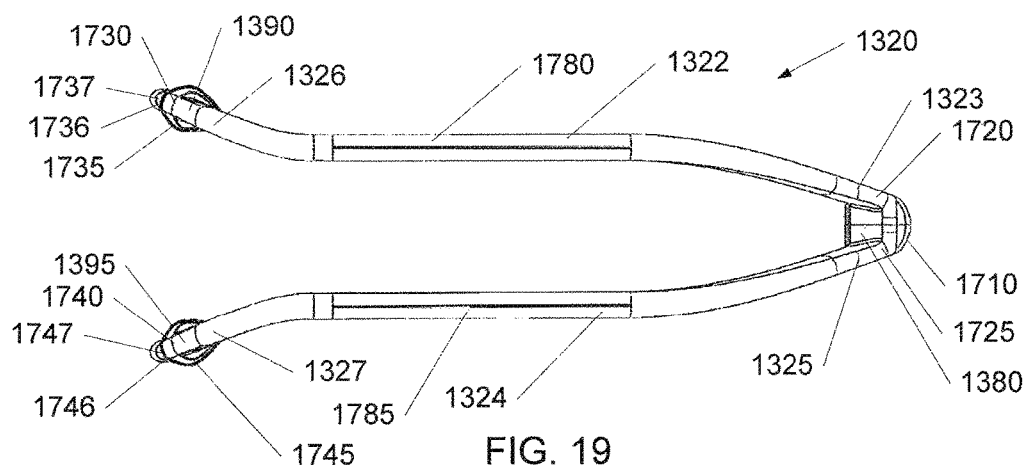
FIG. 19 is a bottom view of the rail of FIG. 13 in accordance with an illustrative embodiment.

Referring now to FIG. 17, a perspective view of the rail 1320 of FIG. 13 in accordance with an illustrative embodiment is shown. Referring to FIG. 18, a side section view of the rail 1320 of FIG. 13 in accordance with an illustrative embodiment is shown. Referring to FIG. 19, a bottom view of the rail 1320 of FIG. 13 in accordance with an illustrative embodiment is shown.

As discussed above, the rail 1320 can include a first support portion 1322 and a second support portion 1324. The first support portion 1322 can include the first front 1323 and the first rear 1326. The second support portion 1324 can include the second front 1325 and the second rear 1327. The first front 1323 of the first support portion 1322 and the second front 1325 of the second support portion 1324 can be coupled by a front rail mounting portion 1380. The first support portion 1322 can include a first rear rail mounting portion 1390. The second support portion 1324 can include a second rear rail mounting portion 1395.

The front rail mounting portion 1380 can include a cleat 1710, a notch 1715, a first front ankle 1720 and a second front ankle 1725. The cleat 1710 can be configured to seat inside the front mounting cup 1360 (not shown). The cleat 1710 and the front mounting cup 1360 can be configured so that a predetermined amount and thickness of adhesive will remain in a space between the cleat 1710 and the front mounting cup 1360. The cleat 1710 can include a notch 1715 for positioning or locating the cleat 1710 in the front mounting cup 1360. In another embodiment the front rail mounting portion 1380 can include a flange to increase bonding area.

The first front ankle 1720 supports and transitions the first support portion 1322 to the cleat 1710. The first front ankle 1720 can generally have the shape of a hoof or cone for spreading forces of a rider's weight over a greater area of the shell 1310. The second front ankle 1725 that supports and transitions the second support portion 1324 to the cleat 1710. The second front ankle 1725 can generally have the shape of a hoof or cone for spreading forces of a rider's weight over a greater area of the shell 1310. The area of a cross-section of the cleat 1710 can be about twice the cross-sections of the first front ankle 1720 and second front ankle 1725 combined. The area of a cross-section of a terminus of the first front ankle 1720 can be about twice a cross-section of the first support portion 1322. The area of a cross-section of a terminus of the second front ankle 1725 can be about twice a cross-section of the second support portion 1324. However, any ratio of cross-sections greater than 1.5:1 can be used.

The first rear rail mounting portion 1390 can include a first tab 1736, a first notch 1737, a first rear ankle 1730 and a first flange 1735. The first tab 1736 can be configured to seat inside the first rear mounting cup 1370 (not shown). The first tab 1736 and the first rear mounting cup 1370 can be configured so that a predetermined amount and thickness of adhesive will remain in a space between the first tab 1736 and the first rear mounting cup 1370. The first tab 1736 can include a first notch 1737 for positioning or locating the first tab 1736 in the first rear mounting cup 1370. The first flange 1735 can be the terminus between the first rear ankle 1730 and the first rear mounting cup 1370 and can help locate the first rear rail mounting portion 1390. The first flange 1735 can include an indexing feature such as having the outline (shape) of a polygon, to prevent rotation of the first rear ankle 1730, or any other shape.

The first rear ankle 1730 supports and transitions the first support portion 1322 to the first rear mounting cup 1370. The terminus of the first rear ankle 1730 can match the outer surface of the rear mounting cup 1370. The first rear ankle 1730 can generally have the shape of a hoof or cone for spreading forces of a rider's weight over a greater area of the shell 1310. The area of a cross-section of a terminus of the first rear ankle 1730 can be about twice a cross-section of the first support portion 1322. However, any ratio of cross-sections can be used.

The second rear rail mounting portion 1395 can include a second tab 1746, a second notch 1747, a second rear ankle 1740 and a second flange 1745. The second tab 1746 can be configured to seat inside the second rear mounting cup 1375 (not shown). The second tab 1746 and the second rear mounting cup 1375 can be configured so that a predetermined amount and thickness of adhesive will remain in a space between the second tab 1746 and the second rear mounting cup 1375. The second tab 1746 can include a second notch 1747 for positioning or locating the second tab 1746 in the second rear mounting cup 1375. The second flange 1745 can be the terminus between the second rear ankle 1740 and the second rear mounting cup 1375 and can help locate the second rear rail mounting portion 1395. The second flange 1745 can have an indexing feature such as having the outline (shape) of a polygon, to prevent rotation of the second rear ankle 1740, or any other shape.

The second rear ankle 1740 supports and transitions the second support portion 1324 to the second rear mounting cup 1375. The terminus of the second rear ankle 1740 can match the outer surface of the rear mounting cup 1375. The second rear ankle 1740 can generally have the shape of a hoof or cone for spreading forces of a rider's weight over a greater area of the shell 1310. The area of a cross-section of a terminus of the second rear ankle 1740 can be about twice a cross-section of the second support portion 1324. However, any ratio of cross-sections can be used.

Advantageously, the ankles of the lightweight saddle base 1300 use less material and, therefore, the rails weigh less than typical designs.

Figure 22:
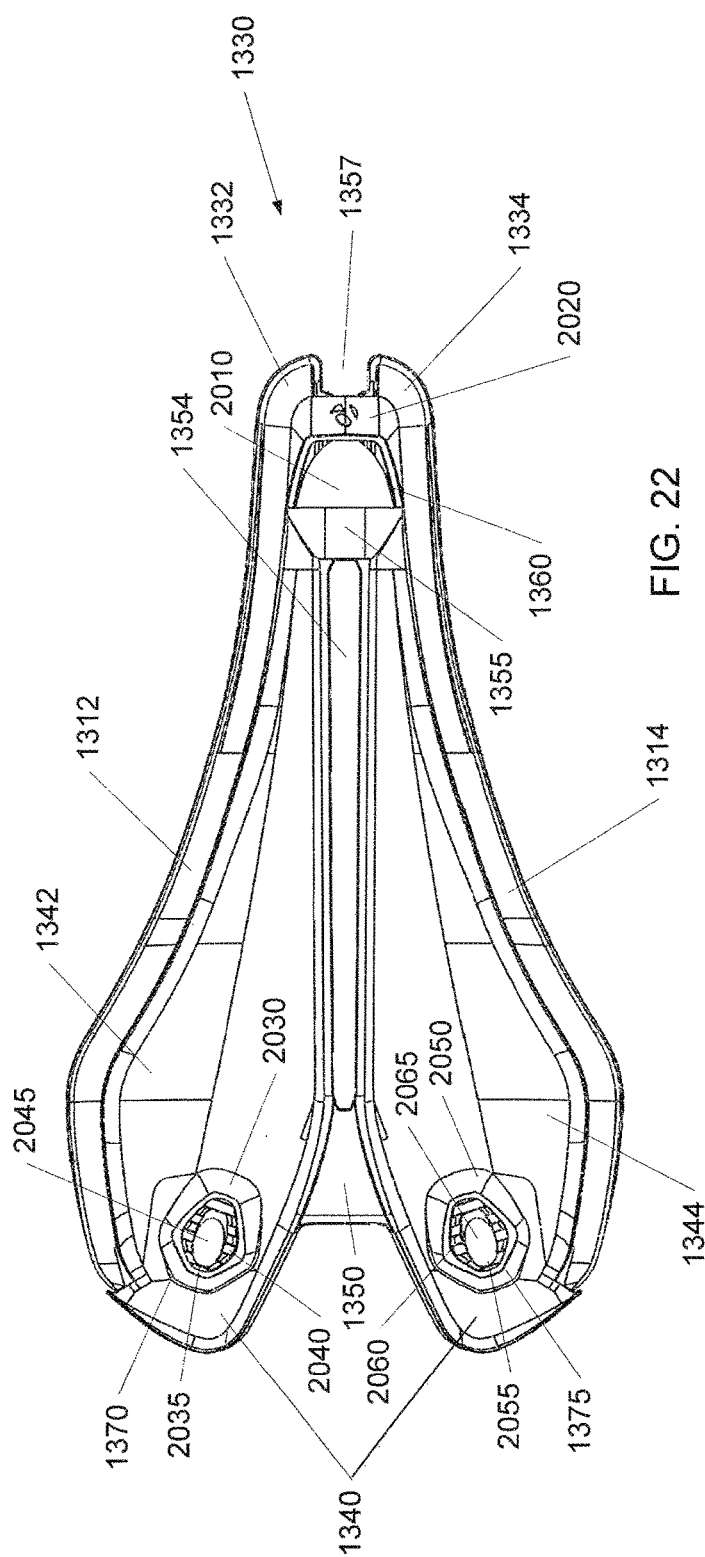
FIG. 22 is a bottom view of the shell of FIG. 13 in accordance with an illustrative embodiment.
Figure 23:
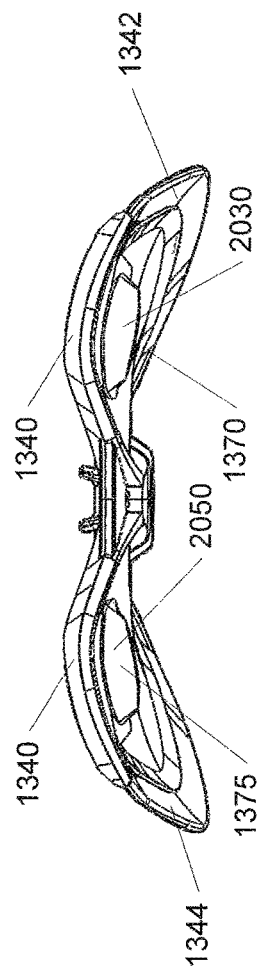
FIG. 23 is a rear view of the shell of FIG. 13 in accordance with an illustrative embodiment.

Referring now to FIG. 20, a perspective view of the shell 1310 of FIG. 13 in accordance with an illustrative embodiment is shown. Referring to FIG. 21, a side section view of the shell 1310 of FIG. 13 in accordance with an illustrative embodiment is shown. Referring to FIG. 22, a bottom view of the shell 1310 of FIG. 13 in accordance with an illustrative embodiment is shown. Referring to FIG. 23, a rear view of the shell 1310 of FIG. 13 in accordance with an illustrative embodiment is shown.

As discussed above, the shell 1310 can form the basic shape of the saddle. The shell 1310 can include the nose portion 1330 and the rear portion 1340. The shell 1310 can include the first side portion 1312 and the second side portion 1314. The first side portion 1312 can include the first nose portion 1332 and the first rear portion 1342. The second side portion 1314 can include the second nose portion 1334 and the second rear portion 1344. In one illustrative embodiment, the first side portion 1312 and the second side portion 1314 can be connected by the first web wall 1350 and the second web wall 1355.

The shell 1310 can include the front mounting cup 1360, the first rear mounting cup 1370, and a second rear mounting cup 1375. The front mounting cup 1360, the first rear mounting cup 1370, and the second rear mounting cup 1375 can be configured to accept or capture the rail 1320.

The front mounting cup 1360 can include a base plate 2010, a tongue 2020, and an alignment groove (not shown). The cleat 1710 (not shown) can be bonded in between the base plate 2010 and the tongue 2020.

The first rear mounting cup 1370 can include a diffusion base 2030, an alignment ridge 2035, a bonding surface 2040, and a hole 2045. The diffusion base 2030, the alignment ridge 2035, the bonding surface 2040, and the hole 2045 can be configured to accept the first rear rail mounting portion 1390. The alignment ridge 2035 can be configured to mate with the first notch 1737 (not shown). The bonding surface 2040 can be configured to mate with the first flange 1735 (not shown). The bonding surface 2040 can include ridges and grooves to increase surface area for bonding. The hole 2045 can be configured to accept the first tab 1736. The hole 2045 can be blind or can extend through the shell 1310.

The diffusion base 2030 can support and transition the first rear ankle 1730 to the first rear mounting cup 1370. The terminus of the first rear ankle 1730 can match, transition, or flow into the outer surface of the rear mounting cup 1370. The diffusion base 2030 can generally have the shape of a polyhedron or cone for spreading forces of a rider's weight over a greater area of the shell 1310. The diffusion base 2030 can provide a chamfered or filleted transition from the shell 1310 to the first rear ankle 1730. The area of a cross-section of a base of the diffusion base 2030 can be about twice a cross-section of the terminus of the first rear ankle 1730. However, any ratio of cross-sections can be used.

The second rear mounting cup 1375 can include a diffusion base 2050, an alignment ridge 2055, a bonding surface 2060, and a hole 2065. The diffusion base 2050, the alignment ridge 2055, the bonding surface 2060, and the hole 2065 can be configured to accept the second rear rail mounting portion 1395. The alignment ridge 2055 can be configured to mate with the second notch 1747 (not shown). The bonding surface 2060 can be configured to mate with the second flange 1745 (not shown). The bonding surface 2060 can include ridges and grooves to increase surface area for bonding. The hole 2065 can be configured to accept the second tab 1746 (not shown). The hole 2065 can be blind or can extend through the shell 1310.

The diffusion base 2050 can support and transition the second rear ankle 1740 to the second rear mounting cup 1375. The terminus of the second rear ankle 1740 can match, transition, or flow into the outer surface of the rear mounting cup 1375. The diffusion base 2050 can generally have the shape of a polyhedron or cone for spreading forces of a rider's weight over a greater area of the shell 1310. The diffusion base 2050 can provide a chamfered or filleted transition from the shell 1310 to the second rear ankle 1740. The area of a cross-section of a base of the diffusion base 2050 can be about twice a cross-section of the terminus of the second rear ankle 1740. However, any ratio of cross-sections greater than 1.5:1 can be used.

Figure 24:
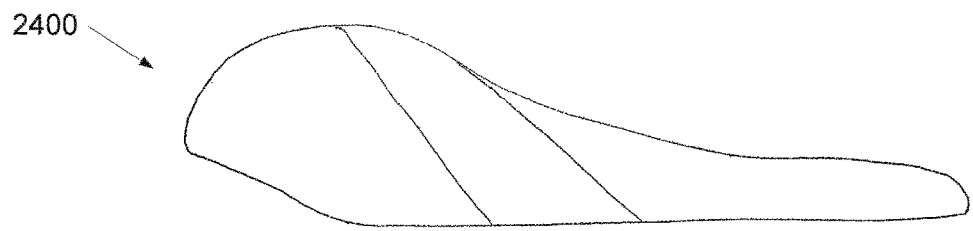
FIG. 24 is a top view of a saddle cover in accordance with an illustrative embodiment.

Referring now to FIG. 24, a top view of a saddle cover 2400 in accordance with an illustrative embodiment is shown. The saddle cover 2400 can be used to cover half of a saddle, for example, the saddle of FIG. 2 or FIG. 13. The saddle cover 2400 can include multiple layers of material fused or bonded together with foam, as described further below.

Figure 25:
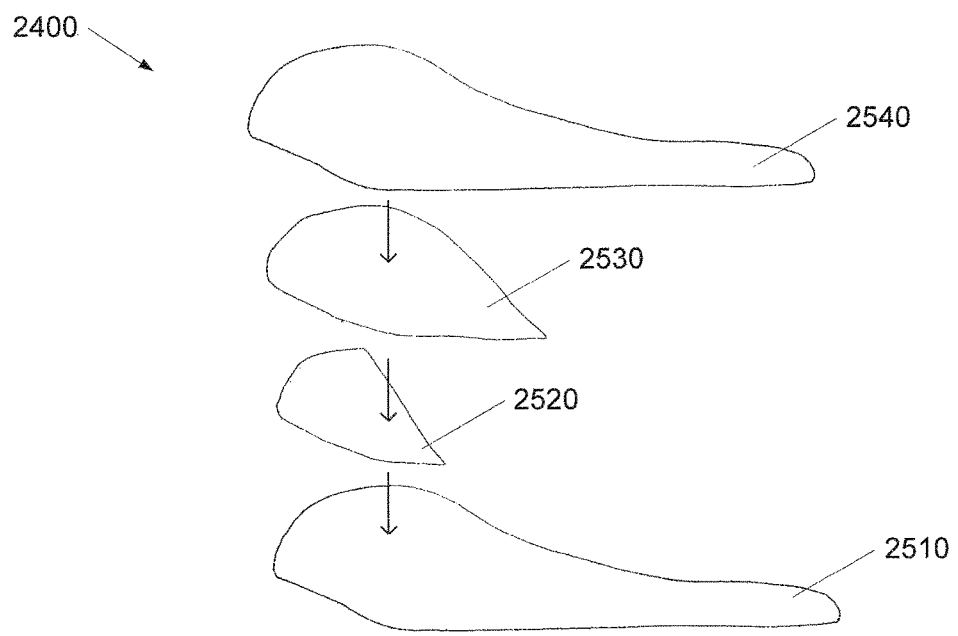
FIG. 25 is an exploded view of the saddle cover of FIG. 24 in accordance with an illustrative embodiment.

Referring now to FIG. 25, an exploded view of the saddle cover 2400 of FIG. 24 in accordance with an illustrative embodiment is shown. The saddle cover 2400 can include a substrate 2510, a first layer 2520, a second layer 2530, and a third layer 2540. The substrate 2510 can be any base material for covering a saddle, for example, a woven fabric.

The first layer 2520 can be a thermoplastic polyurethane (TPU). TPU can have excellent abrasion resistance, a rubber-like elasticity, high shear strength, high elasticity, and high transparency. The first layer 2520 can be located on areas of the saddle were greater firmness is desired, for example, under the buttocks. In one embodiment, the first layer 2520 can be located toward the rear of a saddle. The first layer 2520 can be any shape. In another embodiment, first layer 2520 can be a variety of patterns including, for example, stripes, a grid, and a honeycomb. The first layer 2520 can be any color, transparent, clear, or a combination thereof. The first layer 2520 can be any thickness depending on the desired compliance. The first layer 2520 can have texture.

The second layer 2530 can be a mesh. The mesh can be any pitch. The mesh can be any material such as plastic. The second layer 2530 can be any color, transparent, clear, or a combination thereof. The second layer 2530 can be any thickness depending on the desired compliance. Alternatively, the second layer 2530 can be a degassing material. The second layer 2530 can have/provide texture aside from the mesh nature of the layer.

The third layer 2540 can be a thermoplastic polyurethane (TPU). The third layer 2540 can be used to encapsulate the substrate 2510, the first layer 2520, and the second layer 2530. The third layer 2540 can be any color or transparent. The third layer 2540 can be any thickness depending on the desired compliance. The third layer 2540 can have texture.

TPU can be difficult to bond. In one embodiment, the substrate 2510, the first layer 2520, the second layer 2530, and the third layer 2540 can be arranged, for example, in a vacuum form and heated to fuse the substrate 2510, the first layer 2520, the second layer 2530, and the third layer 2540. Typically, when TPU is bonded directly to TPU a gas forms and has nowhere to escape. As the saddle cover 2400 is heated, the second layer 2530 allows gas from the fusing of the first layer 2520 and the third layer 2540 to escape. For example, the mesh of the second layer 2530 provides a path for gas to travel thereby eliminating or reducing the formation of bubbles.

In alternative embodiments, adhesion promoters or additional layers of TPU and mesh can be included. In other alternative embodiments, a foam layer can be co-bonded with the saddle cover 2400 or injection molded into a mold loaded with the saddle cover 2400. The foam layer can include texture and additional shaping. In other alternative embodiments, additional multiple layers of mesh and TPU can be layered to increase stiffness of the saddle cover 2400 over all or specific portions of the saddle cover 2400. For example, a fourth layer of mesh and a fifth layer of TPU can be added. Advantageously, the compliance of the saddle cover 2400 can be controlled locally. Advantageously, defects in the production of the saddle cover 2400 can be reduced.

Figure 26:
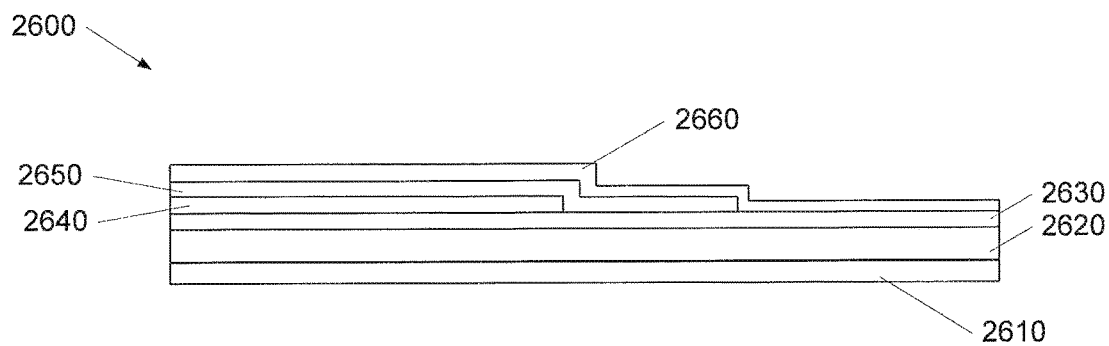
FIG. 26 is a side view diagram of a saddle in accordance with an illustrative embodiment.
Figure 27:
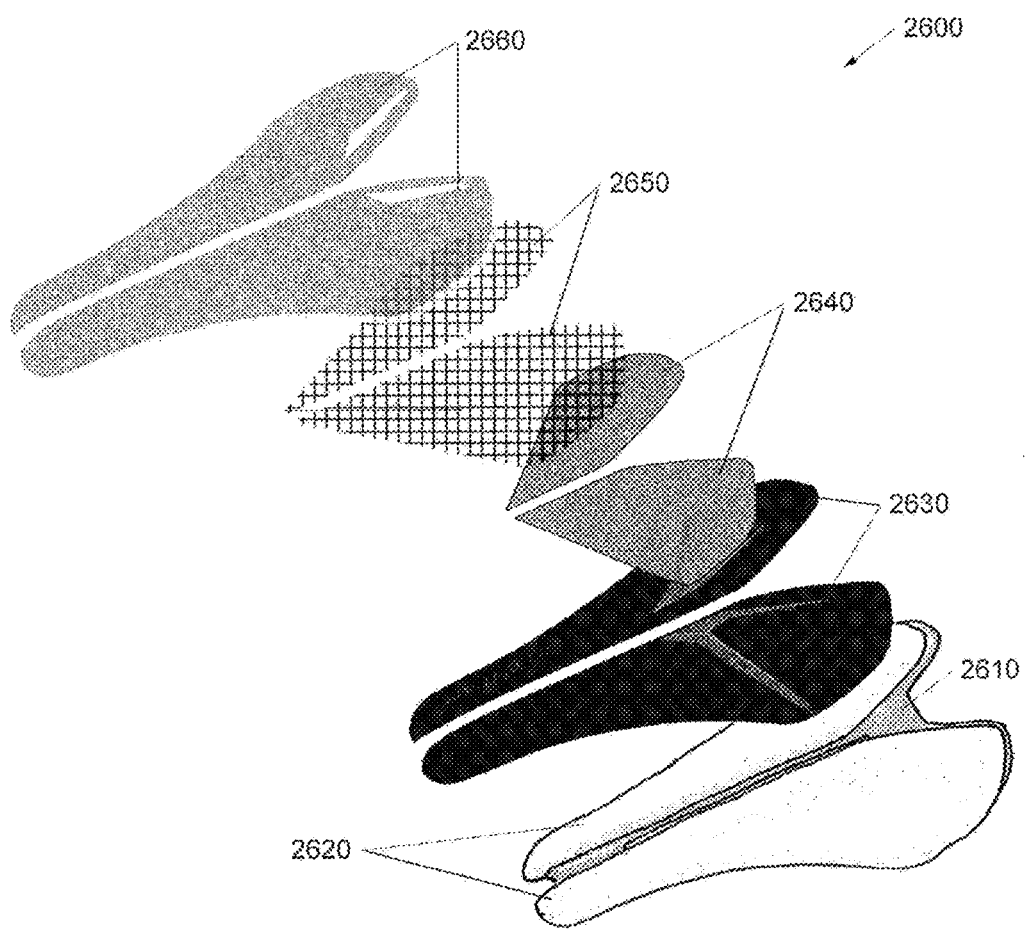
FIG. 27 is an assembly diagram of the saddle in accordance with an illustrative embodiment.

Referring now to FIG. 26, a side view diagram of a saddle 2600 in accordance with an illustrative embodiment is shown. Referring to FIG. 27, an assembly diagram of the saddle 2600 in accordance with an illustrative embodiment is shown. The saddle 2600 can include a shell 2610, a foam layer 2620, a substrate 2630, a first layer 2640, a second layer 2650, and a third layer 2660.

The shell 2610 can be a nylon or fiber reinforced plastic shell as described above. A foam layer 2620 can be adhered to at least a portion of the shell 2610. For example, a separate piece of foam can be adhered to a right half of the shell 2610 and a left half of the shell 2610. Any kind of foam can be used, for example, polyurethane foam. Alternatively, the foam can cover the entirety of the top surface of the saddle.

The substrate 2630 can be any base material for covering a saddle, for example, a woven fabric. The substrate 2630 can float on the foam layer 2620 or be coupled to the first layer 2640. The substrate 2630 can have texture. The substrate 2630 can have graphics.

The first layer 2640 can be TPU. The second layer 2650 can be a mesh or degassing material. The third layer 2660 can be TPU. The second layer 2650 can be located between the first layer 2640 and the third layer 2660. The first layer 2640, the second layer 2650, and the third layer 2660 can be fused or bonded together.

Advantageously, in areas of the saddle 2600 where there is both the first layer 2640 and the third layer 2660, the saddle 2600 will be less compliant than where there is only the third layer 2660.

One or more flow diagrams may have been used herein. The use of flow diagrams is not meant to be limiting with respect to the order of operations performed. The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A bicycle seat apparatus, comprising:
   at least one rail including a front mounting portion comprising a front ankle and a rear mounting portion comprising a rear ankle, wherein a cross sectional area of a terminus of the front ankle is larger than a cross sectional area of the at least one rail, and wherein a cross sectional area of a terminus of the rear ankle is larger than the cross sectional area of the at least one rail; and
   a saddle shell including a front mounting cup configured to mate with the front mounting portion of the at least one rail and a rear mounting cup configured to mate with the rear mounting portion of the at least one rail, wherein a cross sectional area of a base of the front mounting cup is larger than the cross sectional area of the terminus of the front ankle, and wherein a cross sectional area of a base of the rear mounting cup is larger than the cross sectional area of the terminus of the rear ankle.

2. The apparatus of claim 1, wherein the front mounting portion intersects the saddle shell at an angle greater than 15 degrees.

3. The apparatus of claim 1, wherein the front mounting portion intersects the saddle shell at an angle greater than 20 degrees.

4. The apparatus of claim 1, wherein the front mounting portion intersects the saddle shell at an angle in a range from about 15 degrees to about 45 degrees.

5. The apparatus of claim 1, wherein the front mounting portion intersects the saddle shell at an angle in a range from about 15 degrees to about 55 degrees.

6. The apparatus of claim 1, wherein the front mounting portion is bonded to the front mounting cup.

7. The apparatus of claim 1, wherein the front mounting portion includes a tab and the front mounting cup includes a notch configured to mate with the tab.

8. The apparatus of claim 1, wherein the front mounting cup includes an indexing feature configured to mate with the front mounting portion to prevent rotation of the front mounting portion.

9. The apparatus of claim 1, wherein the front ankle has a cone shape.

10. The apparatus of claim 1, wherein the front ankle comprises a first front ankle, wherein the front mounting portion also includes a second front ankle, and wherein a cross sectional area of a terminus of the second front ankle is larger than the cross sectional area of the at least one rail.

11. The apparatus of claim 10, wherein the front mounting portion further comprises a cleat that is mounted to the first front ankle and the second front ankle, and wherein the front mounting cup is configured to receive the cleat.

12. The apparatus of claim 11, wherein the front mounting cup includes a base plate and a tongue, and wherein the cleat is bonded in between the base plate and the tongue.

13. The apparatus of claim 1, wherein the rear mounting portion further comprises a tab, and wherein the rear mounting cup includes a hole configured to receive the tab.

14. The apparatus of claim 13, wherein the rear mounting portion further comprises a notch, and wherein the rear mounting cup includes an alignment ridge configured to mate with the notch.

15. The apparatus of claim 1, wherein the rear mounting portion further comprises a flange mounted to the terminus of the rear ankle, and wherein the rear mounting cup includes a bonding surface configured to mate with the flange.

16. The apparatus of claim 1, wherein the rear mounting cup further comprises a diffusion base configured to support the rear ankle.

* * * * *